(12) United States Patent
Desai et al.

(10) Patent No.: US 10,649,889 B2
(45) Date of Patent: May 12, 2020

(54) METHOD AND APPARATUS FOR MANAGING KERNEL MEMORY OF DATA PROCESSING SYSTEMS

(71) Applicant: Apple Inc., Cupertino, CA (US)

(72) Inventors: Lionel D. Desai, San Francisco, CA (US); Russell A. Blaine, San Carlos, CA (US); Benjamin C. Trumbull, San Jose, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 15/996,109

(22) Filed: Jun. 1, 2018

(65) Prior Publication Data

US 2018/0349261 A1 Dec. 6, 2018

Related U.S. Application Data

(60) Provisional application No. 62/514,927, filed on Jun. 4, 2017.

(51) Int. Cl.
| G06F 12/00 | (2006.01) |
| G06F 13/00 | (2006.01) |
| G06F 12/02 | (2006.01) |
| G06F 12/08 | (2016.01) |
| G06F 9/50 | (2006.01) |
| G06F 9/54 | (2006.01) |
| G06F 9/48 | (2006.01) |

(52) U.S. Cl.
CPC ............ *G06F 12/023* (2013.01); *G06F 9/485* (2013.01); *G06F 9/5016* (2013.01); *G06F 9/5022* (2013.01); *G06F 9/542* (2013.01); *G06F 12/08* (2013.01); *G06F 2212/401* (2013.01)

(58) Field of Classification Search
CPC ................. G06F 9/5016; G06F 9/5022; G06F 2212/401; G06F 12/08; G06F 9/485
See application file for complete search history.

(56) References Cited

U.S. PATENT DOCUMENTS

| 7,827,358 | B2 | 11/2010 | Watson et al. |
| 8,892,827 | B2 | 11/2014 | Bernhard, III et al. |
| 8,990,534 | B2 | 3/2015 | Desai et al. |
| 9,286,120 | B2 | 3/2016 | Magee et al. |
| 9,336,068 | B2 | 5/2016 | Parker et al. |
| 9,465,734 | B1 | 10/2016 | Myrick et al. |
| 2007/0005911 | A1* | 1/2007 | Yang ............... G06F 12/023 711/154 |

(Continued)

*Primary Examiner* — Sean D Rossiter
(74) *Attorney, Agent, or Firm* — Womble Bond Dickinson (US) LLP

(57) ABSTRACT

According to one embodiment, it is determined whether data stored in a compressor pool exceeds a first predetermined threshold, the compressor pool being a fixed-size memory pool maintained in a kernel of an operating system. The compressor pool stores a plurality of compressed memory pages, each memory page storing compressed data pages that can be paged out to or paged in from a persistent storage device. The compressed memory pages are associated with a plurality of processes. A memory consumption reduction action is performed to reduce memory usage, including terminating at least one of the processes to reclaim a memory space occupied by the process, in response to determining that the data stored in the compressor pool exceeds the first predetermined threshold.

27 Claims, 7 Drawing Sheets

(56) References Cited

U.S. PATENT DOCUMENTS

| | | | |
|---|---|---|---|
| 2014/0189281 A1 | 7/2014 | Sokol, Jr. | |
| 2015/0347181 A1* | 12/2015 | Myrick | G06F 9/44594 |
| | | | 718/102 |
| 2015/0347262 A1 | 12/2015 | Vyas et al. | |
| 2015/0378612 A1* | 12/2015 | Bhat | G06F 16/9574 |
| | | | 711/154 |
| 2016/0098356 A1* | 4/2016 | Shiu | G06F 3/061 |
| | | | 711/133 |
| 2016/0179400 A1* | 6/2016 | Batra | G06F 3/0608 |
| | | | 711/154 |

* cited by examiner

| Compressed Page | Compressed Page | ... | Compressed Page | ... |
|---|---|---|---|---|

FIG. 2A

| Process ID | Memory Block ID |
|---|---|
| Process 1 | |
| Process 2 | |
| Process 1 | |
| ... | ... |

FIG. 2B

METHOD AND APPARATUS FOR MANAGING KERNEL MEMORY OF DATA PROCESSING SYSTEMS

This application claims the benefit of U.S. Provisional Patent Application No. 62/514,927, filed on Jun. 4, 2017, which is incorporated herein by reference.

FIELD OF THE DISCLOSURE

Embodiments of the present disclosure relate generally to data processing systems. More particularly, embodiments of the disclosure relate to kernel memory management of data processing systems.

BACKGROUND

An operating system is a collection of software that manages device hardware resources and provides common services for computer programs. The operating system is a vital component of the system software in a device. The system software manages and integrates a computer's capabilities. The system software includes the operating system, utility software, device drivers, and other software tools. Application software can be considered to be the computer software that causes a computer to perform useful tasks in response to user requests. A specific instance of application software is called a software application, application program, application or app, which are used interchangeably below. Application programs usually require an operating system to function.

As more and more services are becoming available for data processing systems, the number of applications running in a single device has increased significantly. Multiple applications or processes in the same device compete with each other by sharing the same memory resources and computation resources embedded inside the device. The operating system performs resource/memory management to deal with resource contention in concurrent computing. In some situations, such processing resources may not be sufficient and the resource contention becomes an issue. There has been a lack of efficient ways to manage the processing resources.

BRIEF DESCRIPTION OF THE DRAWINGS

Embodiments of the disclosure are illustrated by way of example and not limitation in the figures of the accompanying drawings in which like references indicate similar elements.

FIGS. 2A and 2B are block diagrams illustrating certain data structures used with embodiments of the disclosure.

DETAILED DESCRIPTION

Figure 1:
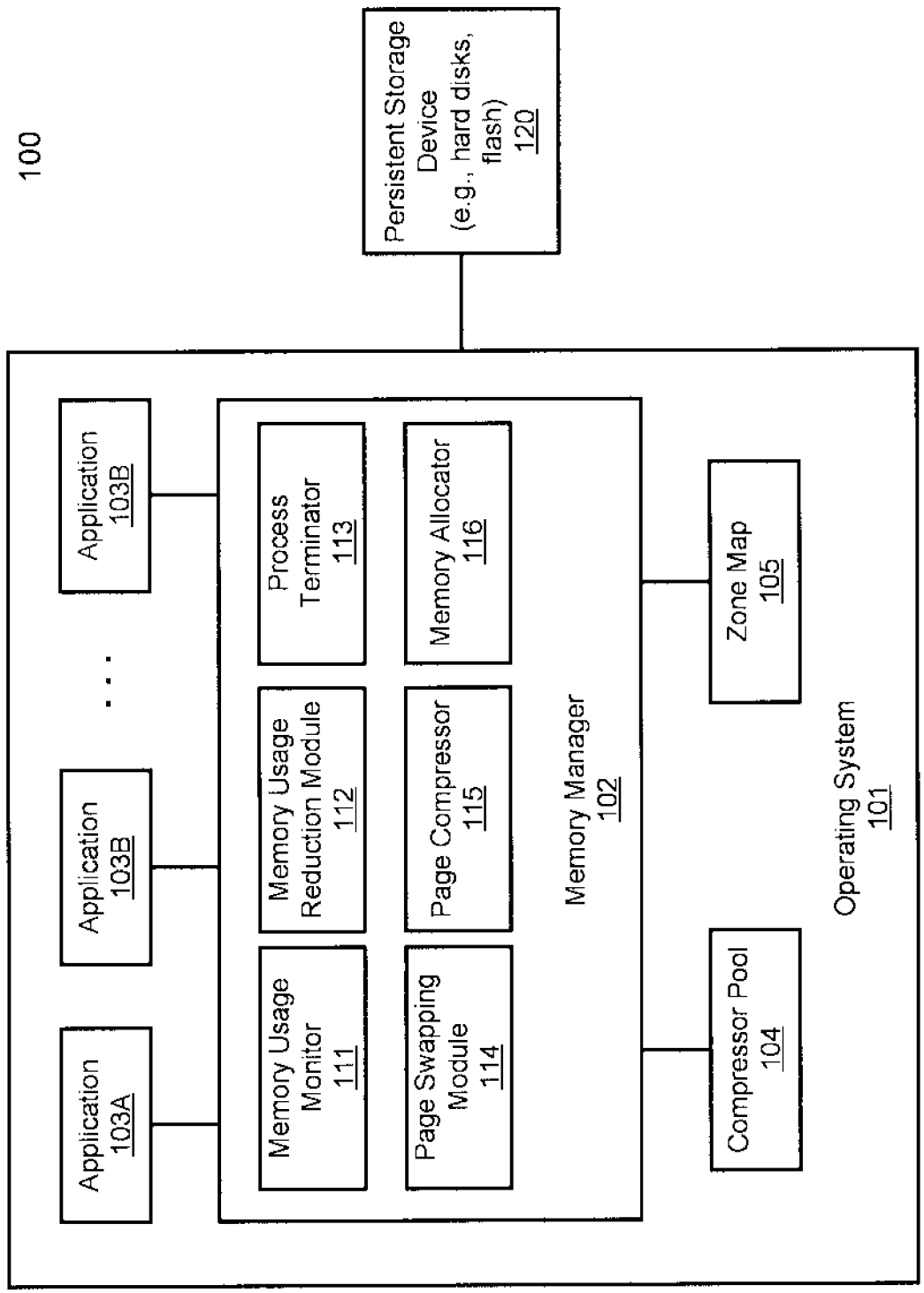
FIG. 1 is a block diagram illustrating a data processing system according to one embodiment of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a memory manager detects that data stored in a compressor pool exceeds a first predetermined threshold. The compressor pool stores a number of compressed pages of data that are associated with a number of processes executed within a data processing system. A compressed memory pool maintained in a memory device (e.g., volatile memory such as dynamic random access memory or DRAM) can provide an additional layer of support for a virtual memory with a persistent storage device (e.g., non-volatile storage devices such as hard disks, flash memory). Virtual memory addresses may be paged or mapped into an uncompressed portion of the memory device, the compressed memory pool and/or the persistent storage device. Each compressed page can be paged out to or paged in from the persistent storage device. In one embodiment, the compressor pool is configured with a fixed size, i.e., the compressor pool will not grow during the run time and in another embodiment, the compressor pool is allowed to dynamically grow up to a maximum size that can be predetermined.

In response to determining that the data stored in the compressor pool has exceeded the first predetermined threshold, a memory usage reduction action is performed by identifying and causing a reduction in memory usage; the action can include requests (via an API) to applications to reduce memory usage and ultimately can include terminating a process to reclaim a memory space occupied by the process. In one embodiment, a process with the most compressed pages in the compressor pool will be terminated first. Thereafter if the consumption of the memory is still high, a process that has allocated an amount of memory exceeding a memory limit corresponding to the process will be terminated. Note that each of the processes running within the data processing system may be configured with a particular memory consumption limit, also referred to as a fatal memory limit. The memory consumption limit refers to a limit of memory that a process would not exceed during normal operations. Thereafter, if the available memory is still low or the data stored in the compressor pool still exceeds the first predetermined threshold, a notification is sent to a process that supports a "save-and-exit" feature via an application programming interface (API) to notify the process that the available memory is low and to request the process to release some of the memory used and/or to exit or terminate itself. The "save-and-exit" feature can be used by an application to save the application's state and/or data so as to avoid an unexpected loss of unsaved application state and/or data; the notification can cause the application to save the application's state and/or data. After a predetermined period of time if the process does not terminate itself, the system may force termination of the process. Note the above memory usage reduction operations can be performed in other sequences or in parallel and they can vary in different levels of effect on the processes that are requested or forced to use less memory. The memory usage reduction operations or actions can include: deletion of purgeable caches of a process; freeze drying the state of a process or application and suspending the application; requesting a process to reduce its usage of optional data structures which are not essential to the process; and terminating a process or application. These operations or actions can be in a hierarchy of actions in which the least aggressive action (e.g. deletion of cache) is performed before using the more aggressive actions (such as terminating the process). Moreover, the processes can be arranged in a hierarchy of processes such as: foreground process; background process; idle process and suspended process. This hierarchy of processes can be used by the memory reduction system's operations to decide which processes to request or cause memory usage reductions. In one embodiment, this hierarchy of processes can be designed to achieve a general intention that attempts to avoid an impact to the user interface due to operations of the memory reduction system; for example, processes that are currently presenting a user interface (e.g. a window or other feature in the user interface) can be excluded from memory reduction operations until memory pressure reaches a threshold that is higher than thresholds used for processes that are not presenting a user interface feature. This hierarchy of processes can also use techniques described in U.S. Pat. No. 9,336,068 (which is incorporated herein by reference) to select or re-order the processes in the hierarchy. The hierarchy of processes can be used to select which process or processes will be subject to memory reduction actions (or requests at a minimum), and the hierarchy of actions can be selected based upon the current memory pressure in the system.

According to another embodiment, the memory manager determines whether data stored in a zone map exceeds a second predetermined threshold. The zone map includes a number of memory allocation entries. Each memory allocation entry corresponds to an allocation of kernel memory, including information identifying a process or thread which allocated (e.g., caller of a "malloc" function) a memory region, as well as the metadata describing the allocated memory block. When a process calls a memory allocation function to allocate a memory block, a new memory allocation entry will be added to the zone map. Similarly, when a process calls a memory deallocation function to release a previously allocated memory region, a corresponding memory allocation entry will be removed from the zone map.

In response to determining that the data stored in the zone map exceeds the second predetermined threshold, the memory manager identifies a process which has a number of memory allocation entries exceeding a third predetermined threshold or has the most memory allocation entries in the zone map and reduces memory consumption by, for example, terminating that process first. Thereafter, if the data stored in the zone map still exceeds the second predetermined threshold, certain less important, or less user-visible, or less critical processes such as a daemon or a command line interface (CLI) process will be selected and terminated first. Thereafter, background processes and then foreground processes will be identified and terminated in order. If any of the processes supports the "save-and-exit" feature, a notification will be sent to the processes to attempt to request the processes to save the data currently processed and then terminate themselves; otherwise, after a period of time, the processes may be forced to terminate.

FIG. 1 is a block diagram illustrating a data processing system according to one embodiment of the disclosure. Referring to FIG. 1, system 100 represents any kind of data processing systems, such as, for example, a server, a desktop (e.g., iMac™ available from Apple Inc.® of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a personal communicator, a gaming device, a network router or hub, a wireless access point (AP) or repeater, a set-top box (e.g., Apple TV™ box), or a combination thereof.

System 100 includes operating system 101, which may be executed by processing resources (e.g., memory, processor(s), not shown). Processing resources may represent one or more processors or processor cores. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. A processor may be a general-purpose processor such as a central processing unit (CPU).

An operating system is a collection of software that manages computer hardware resources and provides common services for computer programs. The operating system is an essential component of the system software in a computer system. Application programs usually require an operating system to function. Amongst many functionalities of an operating system, scheduling is the method by which threads, processes or data flows are given access to system resources (e.g. processor time, communications bandwidth). This is usually done to load balance and share system resources effectively or achieve a target quality of service. In addition, an operating system may further include other core components, such as a scheduler, a device manager, a kernel, etc. In order not to unnecessarily obscure embodiments of the present disclosure, these components are not shown herein. Operating system 101 may be any kind of operating systems, such as, for example, Mac OS™ or iOS™ from Apple®, Android™ from Google®, Windows™ from Microsoft®, or other operating systems (e.g., UNIX, LINUX, real-time or embedded operating systems).

In one embodiment, operating system 100 includes a memory manager 102 configured to manage memory resources utilized by applications 103A-103C (collectively referred to as applications 103). Memory manager 102 is responsible for allocating memory for applications 103, monitoring memory usage by applications 103, deallocating or releasing memory in response to determining that the available memory becomes low. In one embodiment, memory manager 102 includes memory usage monitor 111, memory usage reduction module 112, process termination module 113, page swapping module 114, page compressor 115, and memory allocator or allocation module 116.

Memory usage monitor 111 is configured to monitor the memory usage by applications 103. In one embodiment, memory usage monitor 111 keeps track of data stored in compressor pool 104 and zone map 105. Compressor pool 104 is utilized to keep track of virtual memory usages of programs using user space memory while zone map 105 is utilized to keep track of kernel memory usages. As described above, compressor pool 104 stores a number of compressed memory pages (e.g., virtual memory pages), where the memory pages may be originally stored in an uncompressed memory region of a memory device (not shown). When applications 103 allocate and utilize a memory region from the memory device, the data typically is stored in the form of an uncompressed memory page. Periodically or in response to an event, memory compressor 115 may compress some uncompressed memory pages into one or more compressed pages. The compressed pages may be moved into compressor pool 104 and the storage space of the original uncompressed pages may be released for other usages. For example, memory pages that are not frequently used or recently used (e.g., pages associated with a background application or a suspended application) may be compressed and moved to compressor pool 104 to save the storage space from the uncompressed region for other active or foreground applications, or critical operations. A compressed page can be a variable size or fixed size page. An example of compressor pool 104 is shown in FIG. 2A according to one embodiment.

As the data stored in compressor pool 104 grows, from time to time, page swapping module 114 may swap or page out some compressed pages from compressor pool 104 and store the pages in persistent storage device 120 (and these paged out pages can remain in compressed form). Persistent storage device 120 may be any kind of non-volatile storage devices such as hard disks or solid state storage devices (e.g., flash memory devices). The storage space of a paged-out page may be reused by another process. Alternatively, a paged-out page may be retained or reserved, such that when the page is to be paged in from persistent storage device 120 by page swapping module 114 subsequently, the page can be paged back in at the same storage location in compressor pool. Further detailed information concerning an embodiment of compressor pool 104 can be found in U.S. patent application Ser. No. 13/730,211, filed Dec. 28, 2012, (title: Methods and Apparatus for Compressed and Compacted Virtual Memory; inventor: Joseph Sokol, Jr.) which is incorporated by reference herein in its entirety.

When a process or thread requests for allocating a memory block such as a kernel memory block, memory allocator 116 is configured to allocate a memory block (e.g., a kernel memory block) for the process. In addition, for the purposes of tracking the memory allocation transactions, memory allocator 116 creates a new memory allocation entry in zone map 105 and maintains zone map 105 throughout the operations of operating system 101. The new allocation entry includes information identifying a process or thread (e.g., a process identifier or thread identifier) and the metadata described the allocated memory block (e.g., size and location of the memory block). In one embodiment, both compressor pool 104 and zone map 105 are stored as a part of the kernel memory (in "kernel space"). Thus, every time a process calls a memory allocation function (e.g., a "malloc" function) to allocate a memory block, a new memory allocation entry will be inserted into zone map 105. Zone map 105 includes a number of memory allocation entries, each memory allocation entry corresponding to an invocation of a memory allocation function for allocating a memory block. Multiple memory allocation entries may be associated with a single process or thread as the process or thread may allocate memory blocks multiple times. An example of zone map 105 is shown in FIG. 2B according to one embodiment.

A modern computer operating system usually segregates virtual memory into kernel space and user space. Primarily, this separation serves to provide memory protection and hardware protection from malicious or errant software behavior. Kernel space is strictly reserved for running a privileged operating system kernel, kernel extensions, and most device drivers. In contrast, user space is the memory area where application software and some drivers execute. The term of user space refers to all code that runs on the system in non-privileged mode. User space usually refers to the various programs and libraries that the operating system uses to interact with the kernel: software that performs input/output, manipulates file system objects, application software, etc.

In one embodiment, memory usage monitor 111 is configured to monitor the memory usage in compressor pool 104 and/or zone map 105 as a way to determine whether the available memory is running low. In one embodiment, if it is determined that the data stored in compressor pool 104 or a number of compressed memory pages of compressor pool 104 exceeds a first predetermined threshold, memory usage reduction module 112 performs a memory usage reduction action. Memory usage reduction module 112 may perform a memory reduction action according to a predetermined memory reduction scheme. Memory reduction schemes or actions used in embodiments described herein can include any one or more of the memory reduction schemes or actions described in: U.S. Pat. Nos. 7,827,358; 8,892,827; 8,990,534; 9,286,120; 9,465,734; US Patent Application No. 2015/0347181; and US Patent Application No. 2015/0347262 and all of these US patents and applications are incorporated herein by reference.

When the available space in compressor pool 104 drops below the threshold, such a situation is referred to as compressor pool exhaustion. There can be a variety of reasons that cause compressor pool 104 exhausted. For example, one or more processes can exhaust compressor pool 104 if the processes leak or demand enough memory to cause compressor pool 104 to reach the threshold or limit. Alternatively persistent storage device 120 may run out of disk space to create new swap files to swap or page out the compressed pages from compressor pool 104. When this situation happens, the system cannot provide free memory to critical subsystems and it quickly grinds to a halt, if no action is taken to reduce the memory usage.

According to one embodiment, in response to determining that the data stored in compressor pool 104 exceeds the first predetermined threshold, memory usage reduction module 112 identifies one or more processes that have a number of compressed memory pages stored in compressor pool 104 exceeding a second predetermined threshold. That is, the processes who have the most compressed memory pages in compressor pool 104 will be the first candidates for memory usage reduction. These processes will be terminated first by process termination module 113, since they occupied the most memory. During the operations, memory manager 102 maintains a compressed page count for each process representing a number of compressed pages in compressor pool 104 associated with the process.

In one embodiment, if the data of compressor pool 104 exceeds the first predetermined threshold, memory usage reduction module 112 identifies one or more processes that have allocated an amount of memory (e.g., virtual memory) exceeding a predetermined memory consumption limit. The identified process or processes will be terminated. A memory consumption limit refers to a limit of memory that a typical process would not allocate more than that. If a process allocated more memory than its corresponding memory consumption limit, that particular process may be malfunctioning or there may be a memory leak within the executable code. By terminating these processes first, there is a chance of stopping the ongoing memory leaks. Note that each process may be configured with a particular memory limit. Some processes may have the same memory limit and others may have different memory limits.

According to another embodiment, when monitoring the memory usage, memory usage monitor 111 detects that data stored in zone map or a number of memory allocation entries exceeds a predetermined threshold. This situation is referred to as zone memory exhaustion. Kernel zone memory comes out of a statically-sized region which cannot be expanded in one embodiment. User space workloads can induce the kernel to exhaust its pool, and once exhausted, the system has to panic (e.g., there is a kernel crash or a system halt).

In response to the detection, memory usage reduction module 112 is invoked to perform a memory usage reduction operation. In one embodiment, memory usage reduction module 112 identifies any processes that have a number of memory allocation entries in zone map 105 exceeding a predetermined threshold and those processes can be terminated first. That is, a process, in one embodiment, having the most memory allocation entries in zone map 105 can be terminated first to free up the memory. The rationale behind this is that if a process allocated the most memory, it is more likely that terminating just that one process will resolve the memory shortage.

Figure 6:
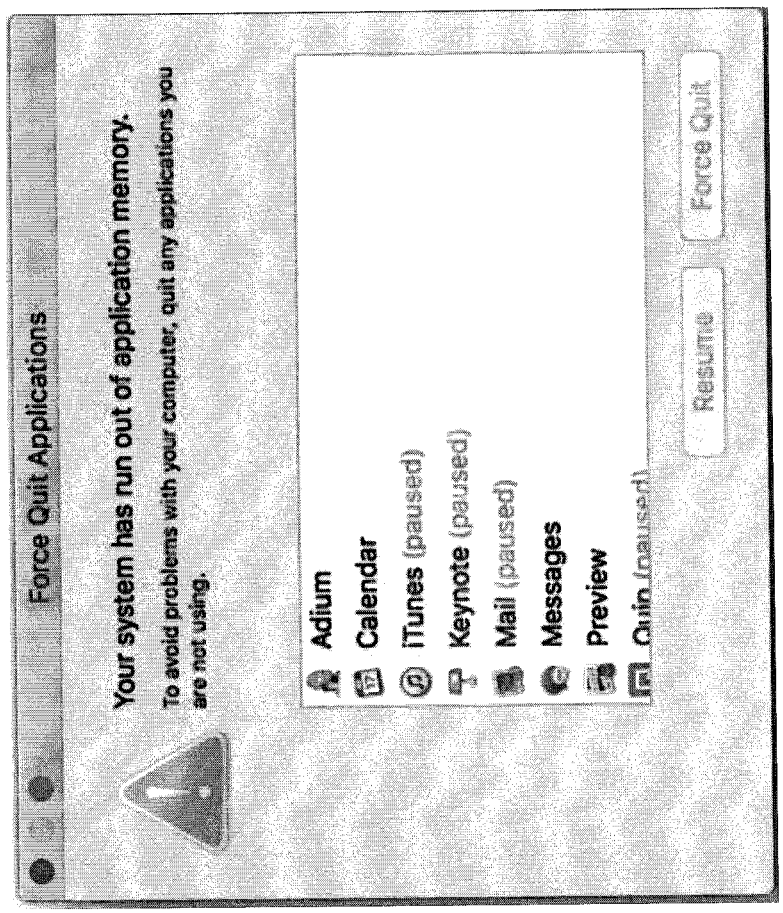
FIG. 6 is a screenshot illustrating a graphical user interface according to one embodiment.

Thereafter, if there is still a need to further reduce memory usage, according to one embodiment, any less important, or less user-visible, or less critical processes such as daemon or CLI processes will be terminated next. Typically, these processes are not critical parts of the operating system. In other words, without these processes, the operating system can still function appropriately. When there is a need, these processes can be relaunched. Moreover, the memory reduction operations can attempt to reduce memory usage by targeting or specifying processes that have the least importance to the overall user experience so that memory reduction operations are performed on those targeted or specified processes (before attempting memory reduction operations on processes that are currently presenting one or more user interface elements). According to another embodiment, a graphical user interface (GUI) page may be displayed to a user who operates the data processing system, where the GUI page lists a list of processes. The GUI page may prompt the user to select one or more of the listed processes to be suspended or terminated to reduce memory usage. An example of the GUI page is shown in FIG. 6 according to one embodiment.

Note that some of the processes may support a "save-and-exit" feature, where the "save-and-exit" feature refers to a communication mechanism that allows a particular process to receive request for memory usage reduction, have a chance to save the pending data being processed, and exit or terminate itself safely. In order to support such a "save-and-exit" feature, a process can implement and support a predetermined API. When an application is installed, the metadata of the application is examined in one embodiment to determine whether the application supports the "save-and-exit" feature. In one embodiment of the save-and-exit feature, an application launcher (e.g., the dock on Mac OS) can present the icon of an application that has saved and exited (as requested by the embodiment described here) as if the application is still running, so the user believes it has not been terminated. Similarly, windowing systems that include buffers of display data of windows of the application can be retained (and hence the windows can still appear on the screen) even though the application has saved and exited. If the icon or one of such windows are selected (e.g., a "click") by the user, the application can be relaunched, which for a well-behaved application, could appear to the user to be identical to what they would see if the application had never been terminated using the save-and-exit feature.

According to one embodiment, if a process supports a "save-and-exit" feature, process termination module 113 sends a notification to the process via an API to notify the process that the corresponding process has been selected as a candidate for memory usage reduction. In response to the request, the process may quickly wind down the operations and save the pending data, and exit or terminate itself. In the event that the process cannot fulfill the request, after a predetermined period of time after the notification, process termination module 133 can force termination of the process. In one embodiment, less important, or less user-visible, or less critical processes may be selected first as candidates for termination. For example, background, suspended, and/or idle processes may be terminated prior to terminating foreground or active processes.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 3:
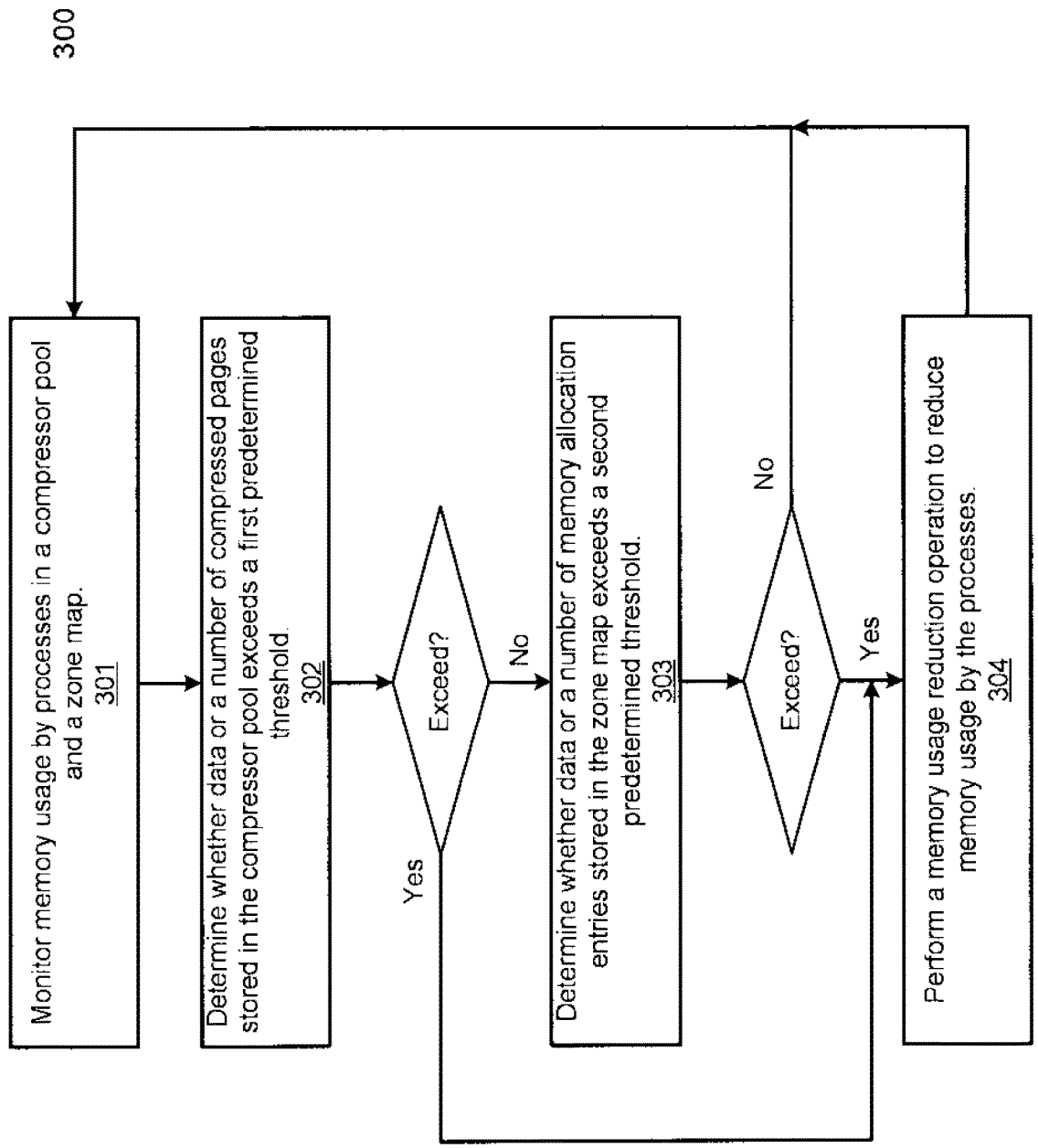
FIG. 3 is a flow diagram illustrating a process of memory management according to one embodiment.

FIG. 3 is a flow diagram illustrating a process of memory management according to one embodiment. Process 300 may be performed by processing logic that includes hardware (e.g. circuitry, dedicated logic, etc.), software (e.g., embodied on a non-transitory computer readable medium), or a combination thereof. For example, process 300 may be performed by memory manager 102 of FIG. 1. Referring to FIG. 3, at block 301, processing logic monitors the memory usage (e.g., kernel memory usage) of a compressor pool and/or a zone map by processes. At block 302, processing logic determines whether data or a number of compressed pages stored in the compressor pool exceeds a first predetermined threshold. If so, at block 304, processing logic performs a memory usage reduction operation.

If the data or the number of compressed pages of the compressor pool does not exceeds the first predetermined threshold, at block 303, processing logic determines whether data or a number of memory allocation entries stored in the zone map exceeds a second predetermined threshold. If so, at block 304, the processing logic performs the memory usage reduction operation. The memory usage reduction operation is block 304 can use a hierarchy of processes to decide which process or processes should be subject to memory usage reduction operations. Moreover, the memory usage reduction operation in block 304 can use a hierarchy of memory usage reduction actions on the selected process or processes, and these memory usage reduction actions can include any one or more memory usage reduction actions described in the following US patents and US applications (all of which are incorporated herein by reference): U.S. Pat.

Nos. 7,827,358; 8,892,827; 8,990,534; 9,286,120; 9,465,734; US Patent Application No. 2015/0347181; and US Patent Application No. 2015/0347262. The above operations may be iteratively performed during the operations of an operating system. Note that the above operations may be performed in other sequences or in parallel. For example, the zone map may be processed prior to processing the compressor pool. Alternatively, they can be processed in parallel.

Figure 4:
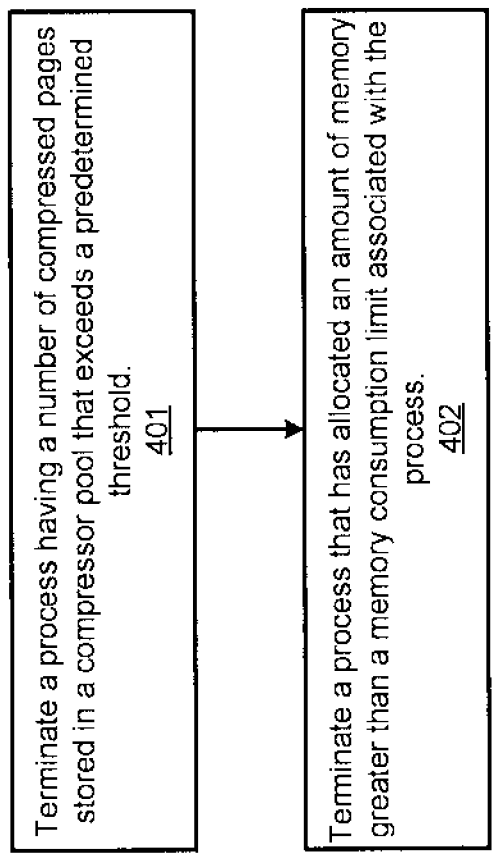
FIG. 4 is a flow diagram illustrating a process of memory management according to one embodiment.

FIG. 4 is a flow diagram illustrating a process of memory management according to one embodiment. Process 400 may be performed by processing logic that includes hardware (e.g. circuitry, dedicated logic, etc.), software (e.g., embodied on a non-transitory computer readable medium), or a combination thereof. For example, process 400 may be performed by memory manager 102 of FIG. 1 as part of memory reduction operation at block 304 of FIG. 3, in response to determining that the data stored in the compressor pool exceeds a predetermined threshold. Referring to FIG. 4, at block 401, processing logic identifies and terminates any process that has a number of compressed pages in the compressor pool exceeding a predetermined threshold. At block 402, processing logic identifies and terminates any process that has allocated an amount of memory greater than a predetermined memory consumption limit associated with the process.

Figure 5:
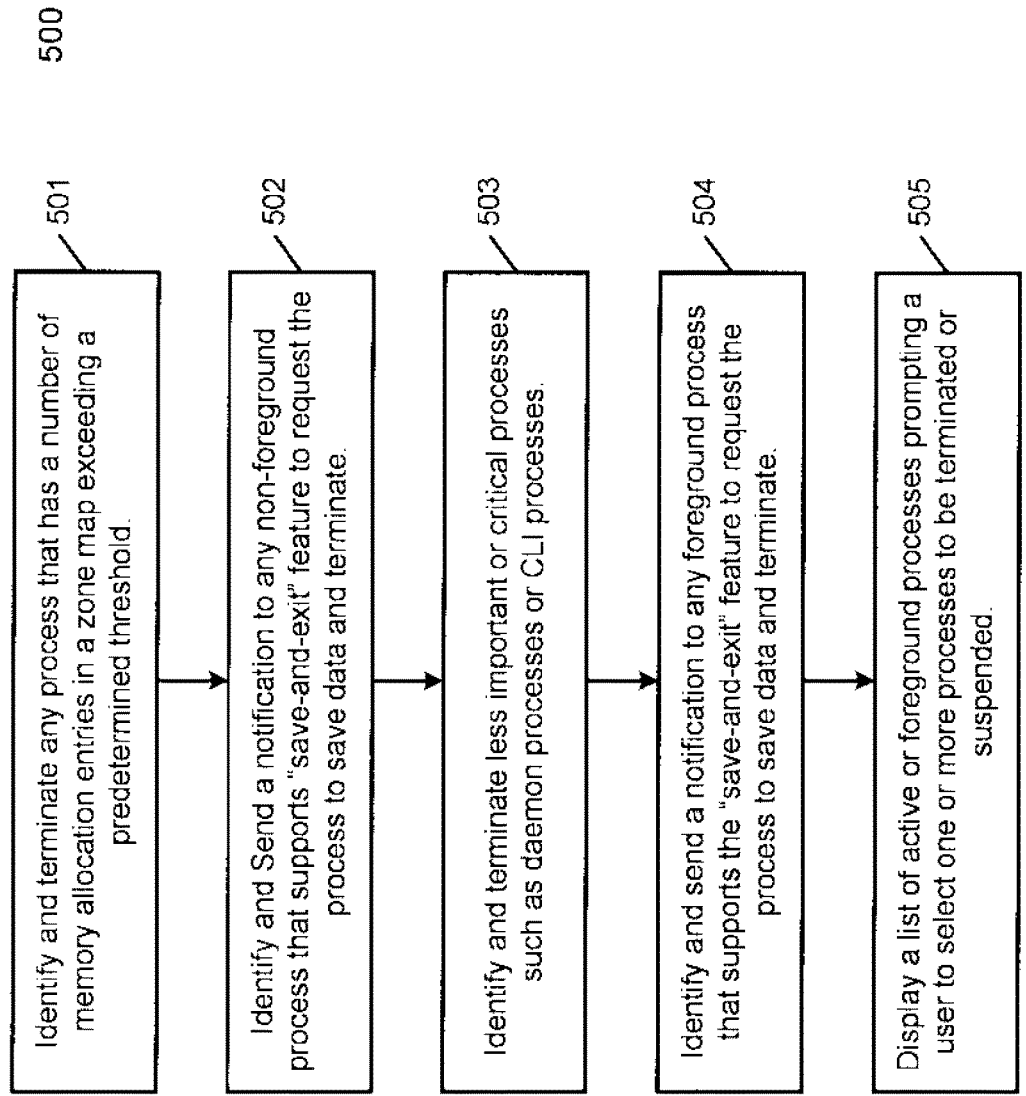
FIG. 5 is a flow diagram illustrating a process of memory management according to one embodiment.

FIG. 5 is a flow diagram illustrating a process of memory management according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by memory manager 102 of FIG. 1 as part of memory reduction operation at block 304 of FIG. 3, in response to determining that the data stored in the zone map exceeds a predetermined threshold.

Referring to FIG. 5, at block 501, processing logic identifies and terminates any process that has a number of memory allocation entries in the zone map exceeding a predetermined threshold. At block 502, processing logic identifies and sends a notification to any non-foreground process that support the "save-and-exit" feature to terminate itself. If after a period of time the process cannot terminate itself, processing logic will force to terminate the process. At block 503, processing logic identifies and terminates certain less important, or less user-visible, or less critical processes such as daemon and/or CLI processes. At block 504, processing logic identifies and sends a notification to any foreground process that supports the "save-and-exit" feature to request the process to exit. Otherwise after a period of time, the processing logic will force to terminate the process. At block 505, if there is any process that can be suspended or terminated, processing logic causes a GUI page to be displayed. The GUI page lists all of the processes that can be suspended or terminated to allow a user to select one or more of the processes for suspension or termination.

Figure 7:
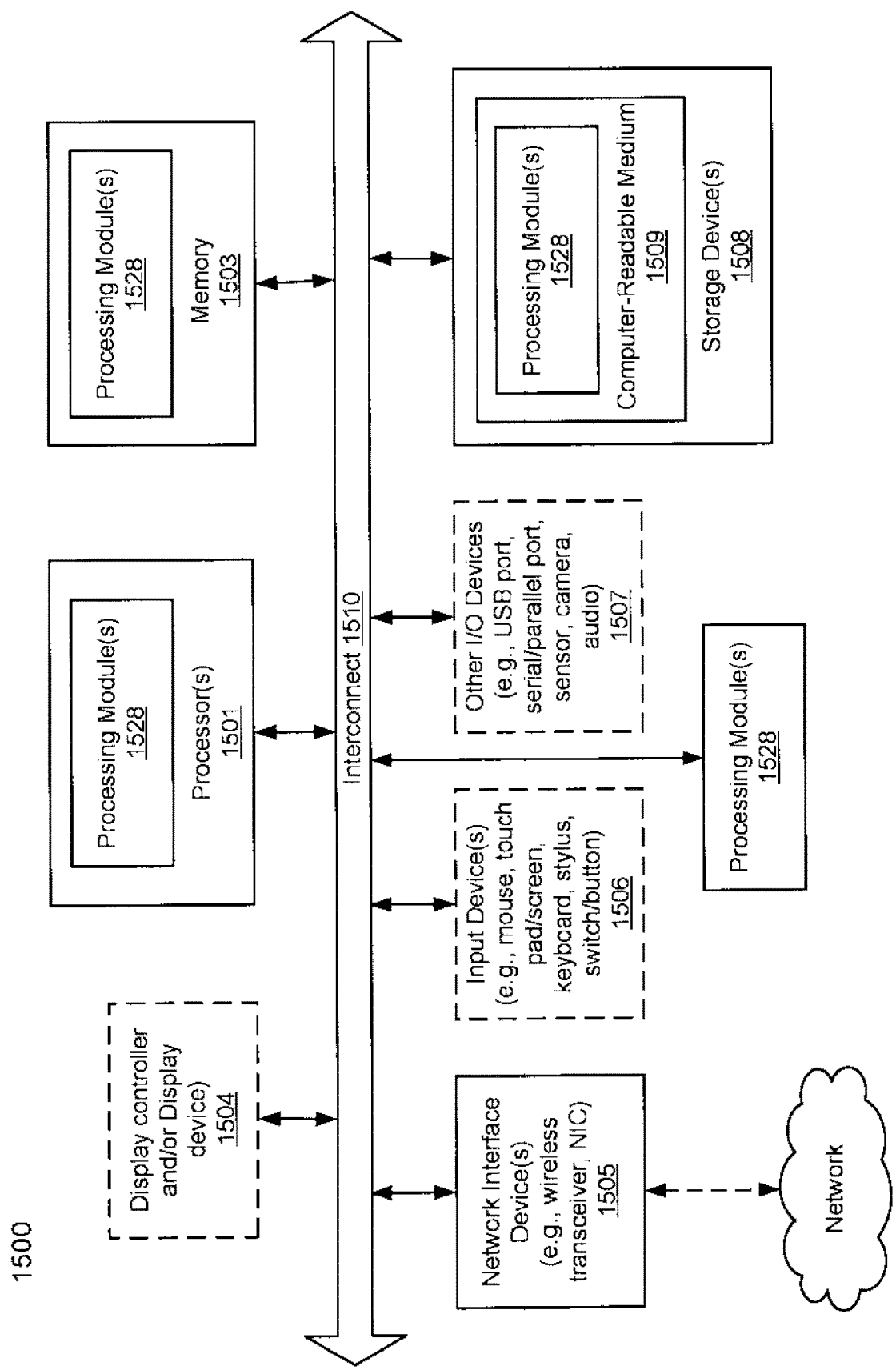
FIG. 7 is a block diagram illustrating a data processing system according to one embodiment.

FIG. 7 is a block diagram illustrating an example of a data processing system which may be used with one embodiment of the disclosure. For example, system 1500 may represents any of data processing systems described above performing any of the processes or methods described above such as system 100 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop (e.g., iMac™ available from Apple Inc.® of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a personal communicator, a gaming device, a network router or hub, a wireless access point (AP) or repeater, a set-top box (e.g., Apple TV™ box), or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS/iOS® from Apple, Android® from Google®, Linux®, Unix®, or other real-time or embedded operating systems such as VxWorks.

System 1500 may further include I/O devices such as devices 1505-1508, including network interface device(s) 1505, optional input device(s) 1506, and other optional I/O device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

I/O devices 1507 may include an audio device. An audio device may include a speaker and/or a microphone to facilitate voice-enabled functions, such as voice recognition, voice replication, digital recording, and/or telephony functions. Other I/O devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, memory manager 102 of FIG. 1. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, such as volatile DRAM (Dynamic Random Access Memory) and flash memory, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

It is apparent for those skilled in the art that, for the particular operation processes of the units/modules described above, reference may be made to the corresponding operations in the related method embodiment sharing the same or similar concept and the reference is regarded as the disclosure of the related units/modules also. And therefore some of the particular operation processes will not be described repeatedly or in detail for convenience and concision of description.

It is also apparent for those skilled in the art that the units/modules can be implemented in an electronic device in the manner of software, hardware and/or combination of software and hardware. Units described as separate components may or may not be physically separated. In particular, units according to each embodiment of the present disclosure may be integrated in one physical component or may exist in various separate physical components. The various implementations of units in the electronic device are all included within the scope of protection of the disclosure.

It should be understood that the unit, apparatus, and device described above may be implemented in form of software, hardware known or developed in the future and/or the combination of such software and hardware. It is apparent for persons in the art that the operations or functional blocks described above may be implemented in form of software, hardware and/or the combination of such software and hardware, depending on the particular application environment. At least some of the operations or functional blocks described above can be implemented by running instructions in general processor, with the instructions stored in storage. At least some of the operations or functional blocks described above can also be implemented by various hardware, including but not limited to DSP, FPGA, ASIC etc. For example, the components, modules, units, and/or functional blocks described above may be implemented by instructions running in CPU or by special processor such as DSP, FPGA, ASIC implementing the functionality of the components, modules, units, and/or functional blocks.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for memory management, the method comprising:
    determining whether data stored in a compressor pool exceeds a first predetermined threshold, the compressor pool being a fixed-size memory pool maintained by a kernel of an operating system, wherein the compressor pool stores a plurality of compressed memory pages, each memory page storing compressed data page that can be paged out to or paged in from a persistent storage device, wherein the compressed memory pages are associated with a plurality of processes; and
    automatically performing a memory consumption reduction action to reduce memory usage, the action including terminating at least one of the processes to reclaim a memory space occupied by the process or causing the process to reduce memory usage, in response to determining that the data stored in the compressor pool exceeds the first predetermined threshold.

2. The method of claim 1, wherein performing a memory consumption reduction action comprises terminating a process that has a number of compressed pages stored in the compressor pool exceeding a second predetermined threshold.

3. The method of claim 1, wherein performing a memory consumption reduction action comprises terminating a process that has allocated an amount of kernel memory exceeding a predetermined memory limit associated with the process.

4. The method of claim 1, wherein performing a memory consumption reduction action comprises:
    identifying a process that supports a save-and-exit feature; and
    transmitting a notification to the process via an application programming interface (API) to notify the process that available kernel memory is low and to request the process to reduce memory usage.

5. The method of claim 4, further comprising terminating the process after a predetermined period of time after transmitting the notification.

6. The method of claim 1, further comprising:
    determining whether data stored in a zone map exceeds a second predetermined threshold, the zone map including a plurality of memory allocation entries, wherein each memory allocation entry corresponds to a particular allocation of kernel memory by a particular process or thread; and
    performing the memory consumption reduction action, in response to determining that the data stored in the zone map exceeds the second predetermined threshold.

7. The method of claim 6, wherein performing the memory consumption reduction action comprises terminating a process that has a number of memory allocation entries in the zone map exceeding a third determined threshold.

8. The method of claim 6, wherein performing the memory consumption reduction action comprises terminating a daemon or a command line interface (CLI) process.

9. The method of claim 6, wherein performing the memory consumption reduction action comprises displaying a graphical user interface (GUI) page listing a plurality of processes to allow a user to select one or more of the listed processes for suspension or termination.

10. A non-transitory machine-readable medium having instructions stored therein, which when executed by a processor, cause the processor to perform a method for memory management, the method comprising:
determining whether data stored in a compressor pool exceeds a first predetermined threshold, the compressor pool being a fixed-size memory pool maintained in a kernel of an operating system, wherein the compressor pool stores a plurality of compressed memory pages, each memory page storing compressed data page that can be paged out to or paged in from a persistent storage device, wherein the compressed memory pages are associated with a plurality of processes; and
automatically performing a memory consumption reduction action to reduce memory usage, the action including terminating at least one of the processes to reclaim a memory space occupied by the process or causing the process to reduce memory usage, in response to determining that the data stored in the compressor pool exceeds the first predetermined threshold.

11. The machine-readable medium of claim 10, wherein performing a memory consumption reduction action comprises terminating a process that has a number of compressed pages stored in the compressor pool exceeding a second predetermined threshold.

12. The machine-readable medium of claim 10, wherein performing a memory consumption reduction action comprises terminating a process that has allocated an amount of kernel memory exceeding a predetermined memory limit associated with the process.

13. The machine-readable medium of claim 10, wherein performing a memory consumption reduction action comprises:
identifying a process that supports a save-and-exit feature; and
transmitting a notification to the process via an application programming interface (API) to notify the process that available kernel memory is low and to request the process to reduce memory usage.

14. The machine-readable medium of claim 13, wherein the method further comprises terminating the process after a predetermined period of time after transmitting the notification.

15. The machine-readable medium of claim 10, wherein the method further comprises:
determining whether data stored in a zone map exceeds a second predetermined threshold, the zone map including a plurality of memory allocation entries, wherein each memory allocation entry corresponds to a particular allocation of kernel memory by a particular process or thread; and
performing the memory consumption reduction action, in response to determining that the data stored in the zone map exceeds the second predetermined threshold.

16. The machine-readable medium of claim 15, wherein performing the memory consumption reduction action comprises terminating a process that has a number of memory allocation entries in the zone map exceeding a third determined threshold.

17. The machine-readable medium of claim 15, wherein performing the memory consumption reduction action comprises terminating a daemon or a command line interface (CLI) process.

18. The machine-readable medium of claim 15, wherein performing the memory consumption reduction action comprises displaying a graphical user interface (GUI) page listing a plurality of processes to allow a user to select one or more of the listed processes for suspension or termination.

19. A data processing system, comprising:
a processor; and
a memory coupled to the processor to store instructions, which when executed by the processor, cause the processor to perform a method of memory management, the method including
determining whether data stored in a compressor pool exceeds a first predetermined threshold, the compressor pool being a fixed-size memory pool maintained in a kernel of an operating system, wherein the compressor pool stores a plurality of compressed memory pages, each memory page storing compressed data page that can be paged out to or paged in from a persistent storage device, wherein the compressed memory pages are associated with a plurality of processes, and
automatically performing a memory consumption reduction action to reduce memory usage, the action including terminating at least one of the processes to reclaim a memory space occupied by the process or causing the process to reduce memory usage, in response to determining that the data stored in the compressor pool exceeds the first predetermined threshold.

20. The system of claim 19, wherein performing a memory consumption reduction action comprises terminating a process that has a number of compressed pages stored in the compressor pool exceeding a second predetermined threshold.

21. The system of claim 19, wherein performing a memory consumption reduction action comprises terminating a process that has allocated an amount of kernel memory exceeding a predetermined memory limit associated with the process.

22. The system of claim 19, wherein performing a memory consumption reduction action comprises:
identifying a process that supports a save-and-exit feature; and
transmitting a notification to the process via an application programming interface (API) to notify the process that available kernel memory is low and to request the process to reduce memory usage.

23. The system of claim 22, wherein the method further comprises terminating the process after a predetermined period of time after transmitting the notification.

24. The system of claim 19, wherein the method further comprises:
determining whether data stored in a zone map exceeds a second predetermined threshold, the zone map including a plurality of memory allocation entries, wherein each memory allocation entry corresponds to a particular allocation of kernel memory by a particular process or thread; and
performing the memory consumption reduction action, in response to determining that the data stored in the zone map exceeds the second predetermined threshold.

25. The system of claim 24, wherein performing the memory consumption reduction action comprises terminating a process that has a number of memory allocation entries in the zone map exceeding a third determined threshold.

26. The system of claim 24, wherein performing the memory consumption reduction action comprises terminating a daemon or a command line interface (CLI) process.

27. The system of claim 24, wherein performing the memory consumption reduction action comprises displaying a graphical user interface (GUI) page listing a plurality of processes to allow a user to select one or more of the listed processes for suspension or termination.

* * * * *